United States Patent
Keil

[15] 3,666,681
[45] May 30, 1972

[54] ANTIFOAM PREPARATION FOR AQUEOUS SYSTEMS

[72] Inventor: Joseph W. Keil, Midland, Mich.
[73] Assignee: Dow Corning Corporation, Midland, Mich.
[22] Filed: Mar. 16, 1970
[21] Appl. No.: 20,040

[52] U.S. Cl. .......................................... 252/358, 252/321
[51] Int. Cl. .................................................. B01d 17/00
[58] Field of Search .................................... 252/358, 321

[56] References Cited

UNITED STATES PATENTS 3,033,789  5/1962  Asseff .................................... 252/358
3,076,768  2/1963  Boylan .................................... 252/358

*Primary Examiner*—John D. Welsh
*Attorney*—Robert F. Fleming, Jr., Laurence R. Hobey, Harry D. Dingman and Joseph R. Radzius

[57] ABSTRACT

The present invention relates to an antifoaming preparation for aqueous systems consisting essentially of a water insoluble organic liquid, e.g., mineral oil; a filler; a hydroxyl endblocked organopolysiloxane or a benzene soluble organopolysiloxane resin; and an ingredient, e.g., KOH, a hydrocarbon amine, ammonia, or hexamethyldisilazane which would lend compatibility between the filler and the silicone fluid or silicone resin component. The preparations in question would be particularly useful in the pulp and paper industry.

4 Claims, No Drawings

ANTIFOAM PREPARATION FOR AQUEOUS SYSTEMS

This invention relates to antifoaming or defoaming compositions which are particularly useful for preventing or abating foams in aqueous systems.

Foaming and frothing, which are principally due to entrapment of various vapors, are encountered at the surface of many liquids. Applications in which undesirable foams exist are extremely diverse, with problems ranging from unesthetic foams to foams hazardous to life. Foam problems and their resolutions have been frequently reported in polymerization, paint processing, fermentation, sugar refining, oil well pumping, food preparation, steam generation, sewage disposal, textile dyeing, adhesive processing, and conversion of ores refined by flotation.

Typically, foaming problems are a constant source of disruption in alkaline pulping processes. The alkaline pulping processes generally consist of the soda and kraft or sulfate processes and are alkaline in nature because sodium hydroxide or caustic are normally employed in the former and sodium sulfate or salt cake and sodium hydroxide are used in the latter. These processes currently represent the most utilized pumping procedures in the pulp and paper industry and a factor inherent in their continued acceptance and growth is that the spent chemicals can be readily reclaimed, thus providing an economic advantage over other conceivable methods. In spite of the above, an important disadvantage exists in that extensive foam occurs during the pulp washing, screening, and knotting operation which deleteriously affects the various phases of production.

In accordance with the above, it is an object of this invention to provide a novel antifoaming preparation which prevents or abates undesirable foam in aqueous systems.

Another object of the present invention is the provision of a novel, inexpensive defoamer composition formed of readily available inexpensive materials and having an effectiveness, comparable to or superior to, presently available commercial antifoamers and defoamers.

The nature of the invention as well as other objects and advantages thereof will be readily apparent from a consideration of the following detailed description.

This invention relates to an antifoaming agent for aqueous systems consisting essentially of a mixture of A. 100 parts by weight of a water insoluble organic liquid which is a member selected from the group consisting of mineral oil, esters of carboxylic acids and monohydric alcohols, alcohols containing from 5 to 18 carbon atoms inclusive, polyoxypropylene and polyoxybutylene glycols, triorganophosphates, vegetable oils, and sperm oil, B. from 0.5 to 10.0 parts by weight of an organopolysiloxane compound which is a member selected from the group consisting of a hydroxyl endblocked dimethylpolysiloxane fluid having a viscosity of at least 35 centistokes at 25° C. and a benzene soluble organopolysiloxane resin consisting essentially of 1 $SiO_2$ units and 2 $R_3SiO_{1/2}$ units in which R is a monovalent hydrocarbon radical containing from 1 to 6 carbon atoms inclusive, and in which the ratio of 1 units to 2 units is within the range of from 1.2/1 to 0.6/1, C. from 0.5 to 10.0 parts by weight of a filler which is a member selected from the group consisting of a finely divided silica and a methylsilsesquioxane gel, and D. from 0.002 to 5.0 parts by weight of a compound which is a member selected from the group consisting of a hydrocarbon amine, ammonia, a disilazane of the formula

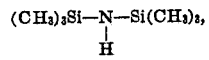

and a compound of the formula R'OH in which R' is an alkali or alkaline earth metal.

As noted above, R can be any monovalent hydrocarbon radical containing from 1 to 6 carbon atoms such as the methyl, ethyl, propyl, isopropyl, butyl, isobutyl, t-butyl, amyl, hexyl, vinyl, allyl, cyclohexyl, and the phenyl radical, among others, whereas R' can be an alkali or alkaline earth metal such as potassium, sodium, lithium, cesium, magnesium, calcium or strontium.

Illustrative examples of the water insoluble organic liquid (A) are mineral oil, and preferably a mineral oil that is high in paraffin content and which is in the viscosity range of from 100 to 300 SSU at 100° F.; esters of carboxylic acids and monohydric alcohols such as dioctyl phthalate, diethyl succinate, methyl caproate, butyl pelargonate, ethyl stearate, nonyl stearate, dodecyl laurate, methyl melissate, etc.,; alcohols containing from 5 to 18 carbon atoms such as amyl alcohol, decyl alcohol, dodecyl alcohol, pentadecyl alcohol, and octadecyl alcohol; polyoxypropylene and polyoxybutylene glycols; triorgano phosphates such as tributyl phosphate and tributoxyethyl phosphate; and vegetable oils such as peanut oil, coconut oil, olive oil, cottonseed oil, and linseed oil, among numerous other; and sperm oil.

If any of the above materials (A) are initially in a solid state, it is necessary that the materials be dispersed in a suitable mutual solvent for (A) and (B), and said mutual solvent may function solely as a dispersing medium to facilitate the production of the defoaming agent.

The organopolysiloxane components designated as (B) are well known and are readily available commercial materials. For example, the benzene soluble organopolysiloxane resin can be prepared by merely reacting a silica hydrosol having a pH of less than 5 with an organosilicon composition composed of groups of the formula

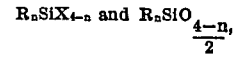

in which R is alkyl, monocyclic aryl hydrocarbon, and halogenated monocyclic aryl hydrocarbon, X is chlorine or alkoxy, and $n$ has a value of from 1 to 3, the average degree of substitution of said composition being from 2.1 to 3 R groups per silicon atom and at least 50 percent of the R groups being alkyl, in amount such that there is at least one mol of organosilyl groups per mol of $SiO_2$ in the silica hydrosol. The reaction proceeds rapidly at 30° C. or above to produce copolymeric siloxanes. During the reaction the mixture is preferably thoroughly agitated. After completion of the reaction, an emulsion forms which separates into two layers upon standing. The layers are then separated and the resin noted above is washed free of acid and dried.

The essential characteristics of the aforesaid organopolysiloxane resin as defined above are the siloxane units present, the ratio of these siloxane units, the fact that the organopolysiloxane is a benzene soluble resin.

The silica designated (C) above is a finely divided silica, e.g., precipitated silicas, fumed silicas, and the like. The silica aerogel employed in the composition of this invention can be prepared by displacing water from a hydrogel in such a manner as to avoid excessive shrinking or crushing of the cellular structure of the material. A method of preparing the silica, which method consists essentially in displacing water from silica gel with a low boiling organic liquid such as ethyl alcohol, or diethyl ether, heating the treated gel in an autoclave to approximately the critical temperature of the organic liquid, releasing vapors of the latter from the autoclave and finally evacuating the autoclave while hot and charged with the residual gel, is described by S. S. Kistler in "J Phys. Chem." 36, 52–64 (1932). Finely divided silica which is quite suitable for use in this invention is commercially available.

The methylsilsesquioxane gel (C) is also well known and is readily prepared by slowly adding methyltrimethoxy silane to water containing alkali such as NaOH, KOH, or the like. As the methyltrimethoxysilane is added, it instantaneously gels or coagulates. The gel is then washed free of alkali and dewatered (centrifuged). Preferably the gel is thereafter pulverized so that more surface area is exposed, thus enhancing the performance of the finished preparation.

As noted above, (D) may be ammonia, hexamethyldisilazane, or a hydrocarbon amine such as brucine, sec-butylamine, cocaine, diethylbenzylamine, diethylamine, diisoamylamine, diisobutylamine, dimethylamine, dimethylaminomethylphenol, dimethylbenzylamine, dipropylamine, ethylamine, ethylenediamine, hydrazine, isoamylamine, isobutylamine, isopropylamine, menthanediamine, methylamine, methyldiethylamine, t-octylamine, t-nonylamine, piperidine, N,N-methoxybenzylamine, o-methylbenzylamine, m-methylbenzylamine, p-methylbenzylamine, N,N,-methylbenzylamine, morphine, nicotine, novocain base, epsilon-phenylamine, delta-phenylbutylamine, beta-phenylethylamine, beta-phenylethylmethylamine, gamma-phenylpropylamine, N,N-isopropylbenzylamine, physostigimine, piperazine, quinidine, solamine, sparetine, tetramethylquanidine, thebaine, t-butyl-2,4,-dinitrophenylamine, t-butyl-2-hydroxyl-5-nitrobenzylamine, n-propylamine, t-octadecylamine, quinine, tetramethylenediamine, triethylamine, triisobutylamine, trimethylamine, trimethylenediamine, tripropylamine, L-arginine, L-lysine, aconitine, benzylamine, cinchonidine, codeine, coniine, emetine, o-methoxybenzylamine, m-methoxybenzylamine, p-methoxybenzylamine, t-butyl-4-isonitrosoamylamine, t-octylamylamine, t-octyl-2-(beta-butoxyethoxy) ethylamine, 2,4,6-tris-(dimethylamino)phenol, aniline, phenylhydrazine, pyridine, quinoline, p-bromophenylhydrazine, n-nitro-o-toluidine, beta-ethoxyethylamine, tetrahydrofurfurylamine, m-aminoacetophenone, iminodiacetonitrile, putrescine, spermin, gamma-N,N-dimethylaminopropylpentamethyldisiloxane, p-toluidine, and veratrine.

The amount of the organopolysiloxane compound (B) employed need only be sufficient to effect the desired defoaming and can vary depending upon the particular water insoluble liquid (A) which is selected. Although a range of from 0.5 to 10.0 parts by weight has been found to be suitable, a range of from about 2.0 to about 5.0 parts by weight has been found to be preferable. More than 10.0 parts by weight can be feasibly used; however, it is not recommended in view of economic considerations and the like.

From 0.5 to 10.0 parts by weight of the filler (C) may be employed, and a range of about 2.0 to about 5.0 parts by weight is preferred. Too little or too much of the filler (C) lends an improper inconsistency to the mixture which has an ultimate effect upon its performance characteristics and/or utility.

From 0.002 to 5.0 parts by weight of the compound (D), e.g., the amine, ammonia, the hexamethyldisilazane, KOH, or the like, has been found to be satisfactory for purposes of the present invention; however, a range of from about 0.02 to about 1.0 parts by weight is particularly suitable. The amount of the compound (D) employed has a critical effect upon compatibility of the mixture and if the amount used falls without the recited limits, the performance of the mixture is detrimentally altered.

It is to be noted that one can include a surfactant in the defoamers of this invention to allow the water insoluble organic liquid to spread at the air-water interface. Anionic, cationic, or non-ionic spreading agents will effectively function in this manner and the type to be selected generally is dependent upon the particular system in which it is to be employed. It should be added, of course, that other additives, e.g., rust inhibitors, emulsifiers, or the like may also be included if desired to impart specific properties where required.

The best means for preparing the mixture of the present invention involves adding an admixture of the organopolysiloxane compound (B), e.g., the hydroxyl endblocked dimethylpolysiloxane and the compound (D), e.g., triethylenetetramine to the water insoluble organic liquid (A), e.g., mineral oil. The above is stirred or otherwise physically mixed to insure that a homogeneous dispersion exists and then the filler (C) is appropriately added. The entire mixture is then sheared by any acceptable means, e.g., a colloid mill and thereafter may or may not be heated to a moderate temperature (about 100° C.) to assure that the filler particles are completed wetted.

It is to be further noted that the quantity of defoaming agent to be introduced to the liquid medium which presents a foaming problem is not especially critical with the exception that it must be incorporated in an amount sufficient to effectively collapse the foam. It is obvious that the amount of defoaming agent employed is dictated by the amount of foam present and how rapidly one wishes to rid the medium of the foam, however, for purposes of the present invention it has been found that approximately one drop of agent per 100 ml. of liquid medium ordinarily will suffice in most situations.

Depending upon the specific mode of application, the compositions defined herein can act as either defoamers or antifoamers. Defoaming agents are foam reducers or palliatives whereas antifoaming agents are foam-prevention materials. Hence when the foam is present in the fluid medium and it is expedient to reduce this foaming, addition of an appropriate amount of the compositions of this invention will arrest further foaming and reduce the foaming present at that time. When one desires to prevent foaming prior to its commencement, the addition of the defoaming agent during the preparation of the fluid medium will retard the anticipated foaming problem that would ordinarily be expected to occur.

The following examples are merely illustrative and are not intended to limit the invention which is properly delineated in the appended claims.

To determine defoaming ability, a hand shaking modified test was performed by adding the defoamer to 100 cc. of 1.0 percent solution of isooctyl phenyl polyethoxyethanol, a commercially available surface active agent, in an 8 ounce round bottle, and then shaking the capped bottle back and forth through an arc of 90° for 12 shakes. The time required for clear liquid to appear through the foam on the top liquid surface was noted as the defoaming time.

Efficiency of the defoaming agents to simulate conditions in the pulp industry were evaluated by testing their ability to defoam concentrated black liquor obtained from a paper mill having approximately 16 percent by weight solids. The apparatus used in evaluating the foaming composition can be described as follows. A beaker of 2,000 cc. capacity is used. A curved outlet fused onto the base of the beaker is connected with a rubber hose to a centrifugal pump. The pump is used to continuously cycle the concentrated black liquor from the beaker to the pump and back into the beaker. The pumping is carried out at a rate so that the black liquor in the beaker is agitated by the reentering liquid to such an extent that the formation of foam appears. In practice the rate is about two gallons per minute. The concentrated black liquor enters the beaker at a point about 4 ¼ inches above the surface of the liquid in the beaker and strikes the surface of the liquid in the beaker at an angle of 90°.

In carrying out the testing of the defoamer composition, 1,000 cc. of concentrated black liquor at 180° F. which contained about 16 percent by weight of solids was placed in the beaker of the apparatus. This liquid, when quiescent and at a temperature of 180° F., filled the beaker to a level of about 3 ¼ inches from the top. Sixty parts per million of the defoaming composition was added to the beaker containing 1,000 cc. of the aforesaid concentrated black liquor. The concentrated black liquor was warmed to maintain the temperature at approximately 180° F. and was at this temperature during the operation of the test. In operation, the pump and stop watch were started simultaneously. The time in seconds for the foam to rise and overflow the beaker was recorded. This time is an indication of the defoaming ability of the defoamer which is being tested. The longer for the foam to overflow the beaker, the better is the defoaming action of the defoamer.

EXAMPLE 1

Using the defoaming agents listed below in accordance with the hand shaking modified test described above, the following results were obtained.

| Sample | Water insoluble organic liquid (A) | Organopolysiloxane compound (B) | Filler (C) | Compound (D) | Time for foam to abate |
|---|---|---|---|---|---|
| (1) | 100 parts mineral oil | 2.0 parts hydroxyl endblocked dimethylpolysiloxane fluid, 35–40 centistokes. | 5.0 parts silica. | 0.2 part triethylene tetramine. | 15 secs. |
| (2) | do | 1.0 part of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | do | 1.0 part hexamethyl-disilazane. | 2 secs. |
| (3) | do | 0.5 part of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | do | 1.5 parts hexamethyl-disilazane. | 5 secs. |
| (4) | 100 parts sperm oil | 1.0 part of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | do | 1.0 part hexamethyl-disilazane. | 24 secs. |
| (5) | 100 parts mineral oil | 2.0 parts of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | 5.0 parts methylsilsesquioxane gel. | 0.02 part KOH. | 2 secs. |
| (6) | 100 parts polyoxypropylene glycol. | 1.0 part of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | 5.0 parts silica. | 1.0 part hexamethyl-disilazane. | 20 secs. |
| (7) | 100 parts trioctyl phosphate. | 5.0 parts of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | 10.0 parts silica. | 1.0 part hexamethyl-disilazane. | 6 secs. |
| (8) | 100 parts coconut oil | 6.0 parts hydroxyl endblocked dimethylpolysiloxane fluid, 35–40 centistokes. | 5.0 parts silica. | 4.0 parts hexamethyl-disilazane. | 30 secs. |
| (9) | 100 parts dioctyl phthalate. | 8.0 parts hydroxyl endblocked dimethylpolysiloxane fluid, 35–40 centistokes. | 5.0 parts silica. | 2.0 parts hexamethyl-disilazane. | 6 secs. |
| (10) | 100 parts mineral oil | 10.0 parts hydroxyl endblocked dimethylpolysiloxane fluid, 2,000 centistokes. | 5.0 parts silica. | 2.0 parts hexamethyl-disilazane. | 30 secs. |
| (11) | 100 parts mineral oil | 2.0 parts hydroxyl endblocked dimethylpolysiloxane fluid, 2,000 centistokes. | 5.0 parts silica. | 2.0 parts ammonia. | 90 secs. |
| (12) | 100 parts mineral oil | 10.0 parts of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | 5.0 parts silica. | 0.05 part KOH. | 2 secs. |
| (13) | 100 parts decyl alcohol | 5.0 parts of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | 5.0 parts silica. | 2.0 parts hexamethyl-disilazane. | 15 secs. |
| (14) | 100 parts mineral oil | 0.5 part of a benzene soluble organopolysiloxane resin consisting of $(CH_3)_3SiO_{1/2}$ units and $SiO_2$ units in which the ratio of $(CH_3)_3SiO_{1/2}$ units to the $SiO_2$ units is within the range from 0.6/1 to 1.2/1. | 0.5 part silica. | 0.5 part hexamethyl-disilazane. | 35 secs. |

When a commercially available black liquor defoamer was used as a control, it took greater than 480 seconds for the foam to abate.

EXAMPLE 2

When the following benzene soluble organopolysiloxane resins were substituted for the corresponding benzene soluble organopolysiloxane resin of Example 1 within the indicated ranges, substantially equivalent results were obtained.

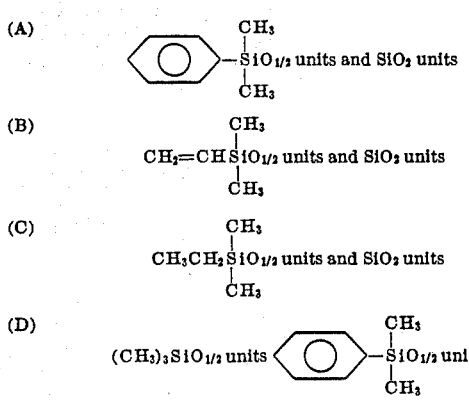

and $SiO_2$ units in which the ratio of the respective units are 0.5 mol to 0.25 mol to 1.0 mol.

EXAMPLE 3

When hydroxyl endblocked dimethylpolysiloxane fluids having viscosities of 50, 100, 1,000, 12,500 and 25,000 centistokes were substituted for the corresponding fluids of Example 1, substantially equivalent results were obtained.

EXAMPLE 4

When using the test described above to determine efficiency of the defoaming agents in the Kraft process, the following results were obtained

| | |
|---|---|
| Control (commercially available defoamer) | 30 seconds for foam to overflow |
| Sample (1), Example 1 | 180 seconds for foam to overflow |
| Sample (5), Example 1 | 160 seconds for foam to overflow |

EXAMPLE 5

When the following materials were substituted for the corresponding materials in the various samples of Example 1, substantially equivalent results were obtained.

| WATER INSOLUBLE ORGANIC LIQUID (A) | COMPOUND (D) |
|---|---|
| Diethyl succinate | Cocaine |
| Methyl caproate | Ethylamine |
| Dodecyl laurate | Hydrazine |
| Ethyl stearate | Methylamine |
| Pentadecyl alcohol | n-Propylamine |
| Polyoxybutylene glycol | Emetine |
| Tributoxyethyl phosphate | p-Toluidine |
| Peanut oil | Veratrine |
| Olive oil | NaOH |
| Cottonseed oil | LiOH |
| Linseed oil | $Mg(OH)_2$ |

That which is claimed is:
1. An antifoaming agent for aqueous systems consisting essentially of a mixture of
   A. 100 parts by weight of a water insoluble organic liquid which is a member selected from the group consisting of mineral oil, esters of carboxylic acids and monohydric alcohols, alcohols containing from 5 to 18 carbon atoms inclusive, polyoxybutylene glycols, triorganophosphates, vegetable oils, and sperm oil,
   B. from 0.5 to 10.0 parts by weight of an organopolysiloxane compound which is a member selected from the group consisting of a hydroxyl endblocked dimethylpolysiloxane fluid having a viscosity of at least 35 centistokes at 25° C. and a benzene soluble organopolysiloxane resin consisting essentially of (1) SiO$_2$ units and (2) R$_3$SiO$_{1/2}$ units in which R is a monovalent hydrocarbon radical containing from 1 to 6 carbon atoms inclusive, and in which the ratio of 1 units to 2 units is within the range of from 1.2/1 to 0.6/1, and C. from 0.5 to 10.0 parts by weight of a filler which is a member selected from the group consisting of a finely divided silica and a methylsilsesquioxane gel, and D. from 0.002 to 5.0 parts by weight of a compound which is a member selected from the group consisting of ammonia, a disilazane of the formula

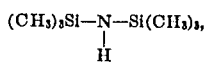

and a compound of the formula R'OH in which R' is an alkali or alkaline earth metal.

2. The antifoaming agent as recited in claim 1 which consists essentially of a mixture of
A. 100 parts by weight mineral oil,
B. 1.0 part by weight of a benzene soluble organopolysiloxane resin consisting of (CH$_3$)$_3$SiO$_{1/2}$ units and SiO$_2$ units in which the ratio of (CH$_3$)$_3$SiO$_{1/2}$ units to the SiO$_2$ units is within the range from 0.6/1 to 1.2/1,
C 2.5 parts by weight silica, and
D 1.0 part by weight hexamethyldisilazane.

3. The antifoaming agent as recited in claim 1 which consists essentially of a mixture of
A 100 parts by weight mineral oil,
B 2.0 parts by weight of a benzene soluble organopolysiloxane resin consisting of (CH$_3$)$_3$SiO$_{1/2}$ units and SiO$_2$ units in which the ratio of (CH$_3$)$_3$SiO$_{1/2}$ units to the SiO$_2$ units is within the range from 0.6/1 to 1.2/1,
C 5.0 parts by weight methylsilsesquioxane gel, and
D 0.02 part by weight KOH.

4. The antifoaming agent as recited in claim 1 which consists essentially of a mixture of
A. 100 parts by weight dioctyl phthalate,
B. 5.0 parts by weight hydroxyl endblocked dimethylpolysiloxane fluid having a viscosity of 35 – 40 centistokes at 25° C.,
C. 5.0 parts by weight silica, and
D. 5.0 parts by weight ammonia.

* * * * *